(12) United States Patent
Holzhauer et al.

(10) Patent No.: US 11,005,873 B2
(45) Date of Patent: *May 11, 2021

(54) MULTI-MODE BOUNDARY SELECTION FOR THREAT DETECTION IN INDUSTRIAL ASSET CONTROL SYSTEM

(71) Applicant: General Electric Company, Schenectady, NY (US)

(72) Inventors: Daniel Francis Holzhauer, Sana Clarita, CA (US); Cody Joe Bushey, Clifton Park, NY (US); Lalit Keshav Mestha, North Coloine, NY (US); Masoud Abbaszadeh, Niskayuna, NY (US); Justin Varkey John, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/511,463

(22) Filed: Jul. 15, 2019

(65) Prior Publication Data

US 2019/0342318 A1    Nov. 7, 2019

Related U.S. Application Data

(63) Continuation of application No. 15/371,723, filed on Dec. 7, 2016, now Pat. No. 10,397,257.

(51) Int. Cl.
*H04L 29/06* (2006.01)
*H04L 12/24* (2006.01)
(Continued)

(52) U.S. Cl.
CPC ........ *H04L 63/1425* (2013.01); *H04L 41/142* (2013.01); *H04L 41/16* (2013.01);
(Continued)

(58) Field of Classification Search
None
See application file for complete search history.

(56) References Cited

U.S. PATENT DOCUMENTS

| | | | | |
|---|---|---|---|---|
| 2014/0283047 A1* | 9/2014 | Dixit | ....................... | G06F 21/55 726/23 |
| 2014/0289852 A1* | 9/2014 | Evans | ..................... | G06F 21/55 726/23 |
| 2018/0083982 A1* | 3/2018 | Asenjo | .................... | H04L 63/10 |

* cited by examiner

*Primary Examiner* — Andrew J Steinle
(74) *Attorney, Agent, or Firm* — Buckley, Maschoff & Talwalkar LLC

(57) ABSTRACT

According to some embodiments, streams of monitoring node signal values may be received over time that represent a current operation of an industrial asset control system. A current operating mode of the industrial asset control system may be received and used to determine a current operating mode group from a set of potential operating mode groups. For each stream of monitoring node signal values, a current monitoring node feature vector may be determined. Based on the current operating mode group, an appropriate decision boundary may be selected for each monitoring node, the appropriate decision boundary separating a normal state from an abnormal state for that monitoring node in the current operating mode. Each generated current monitoring node feature vector may be compared with the selected corresponding appropriate decision boundary, and a threat alert signal may be automatically transmitted based on results of said comparisons.

13 Claims, 18 Drawing Sheets

(51) Int. Cl.
*H04L 12/26* (2006.01)
*H04L 29/08* (2006.01)
(52) U.S. Cl.
CPC .............. *H04L 43/08* (2013.01); *H04L 43/10* (2013.01); *H04L 63/1416* (2013.01); *H04L 63/1441* (2013.01); *H04L 67/10* (2013.01); *H04L 67/12* (2013.01)

MULTI-MODE BOUNDARY SELECTION FOR THREAT DETECTION IN INDUSTRIAL ASSET CONTROL SYSTEM

CROSS-REFERENCE TO RELATED APPLICATIONS

The present application is a continuation of U.S. patent application Ser. No. 15/371,723 entitled "MULTI-MODE BOUNDARY SELECTION FOR THREAT DETECTION IN INDUSTRIAL ASSET CONTROL SYSTEM" and filed on Dec. 7, 2016. The entire content of that application is incorporated herein by reference.

BACKGROUND

Industrial asset control systems that operate physical systems (e.g., associated with power turbines, jet engines, locomotives, autonomous vehicles, etc.) are increasingly connected to the Internet. As a result, these control systems may be vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of a control system and may cause a total shut down or even catastrophic damage to a plant. Currently, Fault Detection Isolation and Accommodation ("FDIA") approaches only analyze sensor data, but a threat might occur in connection with other types of threat monitoring nodes. Also note that FDIA is limited only to naturally occurring faults in one sensor at a time. FDIA systems do not address multiple simultaneously occurring faults as in the case of malicious attacks. Moreover, an industrial asset control system may be associated with different normal operations during different modes of operation (e.g., warm-up mode, shutdown mode, etc.). As a result, data variations can be substantial and determining when a cyber threat is present based on operation of the control system may be difficult—especially when an asset can operate in a relatively large number of different modes (e.g., fifty or more modes). It would therefore be desirable to protect an industrial asset control system from cyber threats in an automatic and accurate manner.

SUMMARY

According to some embodiments, streams of monitoring node signal values may be received over time that represent a current operation of an industrial asset control system. A current operating mode of the industrial asset control system may is received and used to determine a current operating mode group from a set of potential operating mode groups. For each stream of monitoring node signal values, a current monitoring node feature vector may be determined. Based on the current operating mode group, an appropriate decision boundary may be selected for each monitoring node, the appropriate decision boundary separating a normal state from an abnormal state for that monitoring node in the current operating mode. Each generated current monitoring node feature vector may be compared with the selected corresponding appropriate decision boundary, and a threat alert signal may be automatically transmitted based on results of said comparisons.

Some embodiments comprise: means for receiving, from a plurality of real-time monitoring node signal inputs, streams of monitoring node signal values over time that represent a current operation of the industrial asset control system; means for receiving a current operating mode of the industrial asset control system; based on the current operating mode and information in an operating mode classification database, means for determining a current operating mode group from a set of potential operating mode groups, wherein at least some of the set of potential operating mode groups correspond to a plurality of different operating modes of the industrial asset control system; for each stream of monitoring node signal values, means for generating a current monitoring node feature vector; based on the current operating mode group, means for selecting an appropriate decision boundary for each monitoring node, the appropriate decision boundary separating a normal state from an abnormal state for that monitoring node in the current operating mode; means for comparing each generated current monitoring node feature vector with the selected corresponding appropriate decision boundary; and means for automatically transmitting a threat alert signal based on results of said comparisons.

Some technical advantages of some embodiments disclosed herein are improved systems and methods to protect an industrial asset control system from cyber threats in an automatic and accurate manner.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
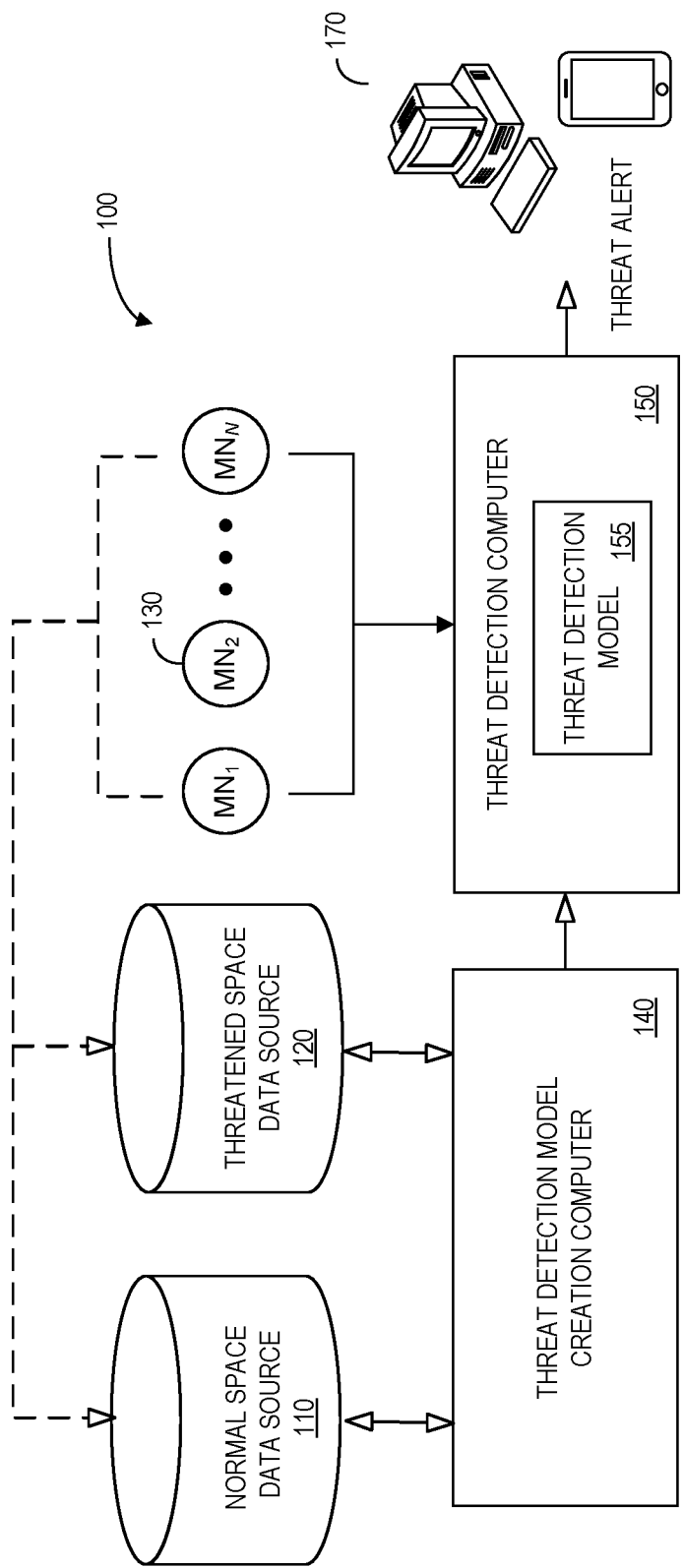
FIG. 1 is a high-level block diagram of a system that may be provided in accordance with some embodiments.

Industrial control systems that operate physical systems are increasingly connected to the Internet. As a result, these control systems may be vulnerable to threats and, in some cases, multiple attacks may occur simultaneously. Existing approaches to protect an industrial control system, such as FDIA approaches, may not adequately address these threats—especially when an industrial asset behaves differently when operating in different operating modes. It would therefore be desirable to protect an industrial asset control system from cyber threats in an automatic and accurate manner. FIG. 1 is a high-level architecture of a system 100 in accordance with some embodiments. The system 100 may include a "normal space" data source 110 and a "threatened space" data source 120. The normal space data source 110 might store, for each of a plurality of "monitoring nodes" 130, a series of normal values over time that represent normal operation of an industrial asset control system (e.g., generated by a model or collected from actual monitoring node 130 data as illustrated by the dashed line in FIG. 1). As used herein, the phrase "monitoring node" might refer to, for example, sensor data, signals sent to actuators, motors, pumps, and auxiliary equipment, intermediary parameters that are not direct sensor signals not the signals sent to auxiliary equipment, and/or control logical(s). These may represent, for example, threat monitoring nodes that receive data from the threat monitoring system in a continuous fashion in the form of continuous signals or streams of data or combinations thereof. Moreover, the nodes may be used to monitor occurrences of cyber-threats or abnormal events. This data path may be designated specifically with encryptions or other protection mechanisms so that the information may be secured and cannot be tampered with via cyber-attacks. The threatened space data source 120 might store, for each of the monitoring nodes 130, a series of threatened values that represent a threatened operation of the industrial asset control system (e.g., when the system is experiencing a cyber-attack).

Information from the normal space data source 110 and the threatened space data source 120 may be provided to a threat detection model creation computer 140 that uses this data to create a decision boundary (that is, a boundary that separates normal behavior from threatened behavior). The decision boundary may then be used by a threat detection computer 150 executing a threat detection model 155. The threat detection model 155 may, for example, monitor streams of data from the monitoring nodes 130 comprising data from sensor nodes, actuator nodes, and/or any other critical monitoring nodes (e.g., monitoring nodes $MN_1$ through $MN_N$), calculate a "feature" for each monitoring node based on the received data, and "automatically" output a threat alert signal to one or more remote monitoring devices 170 when appropriate (e.g., for display to a user). According to some embodiments, a threat alert signal might be transmitted to a unit controller, a plant Human-Machine Interface ("HMI"), or to a customer via a number of different transmission methods. Note that one receiver of a threat alert signal might be a cloud database that correlates multiple attacks on a wide range of plant assets. As used herein, the term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. Moreover, term "automatically" may refer to, for example, actions that can be performed with little or no human intervention. According to some embodiments, information about a detected threat may be transmitted back to the industrial control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 140 may store information into and/or retrieve information from various data stores, such as the normal space data source 110 and/or the threatened space data source 120. The various data sources may be locally stored or reside remote from the threat detection model creation computer 140 (which might be associated with, for example, offline or online learning). Although a single threat detection model creation computer 140 is shown in FIG. 1, any number of such devices may be included. Moreover, various devices described herein might be combined according to embodiments of the present invention. For example, in some embodiments, the threat detection model creation computer 140 and one or more data sources 110, 120 might comprise a single apparatus. The threat detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., threat detection trigger levels) and/or provide or receive automatically generated recommendations or results from the threat detection model creation computer 140 and/or threat detection computer 150.

Figure 2:
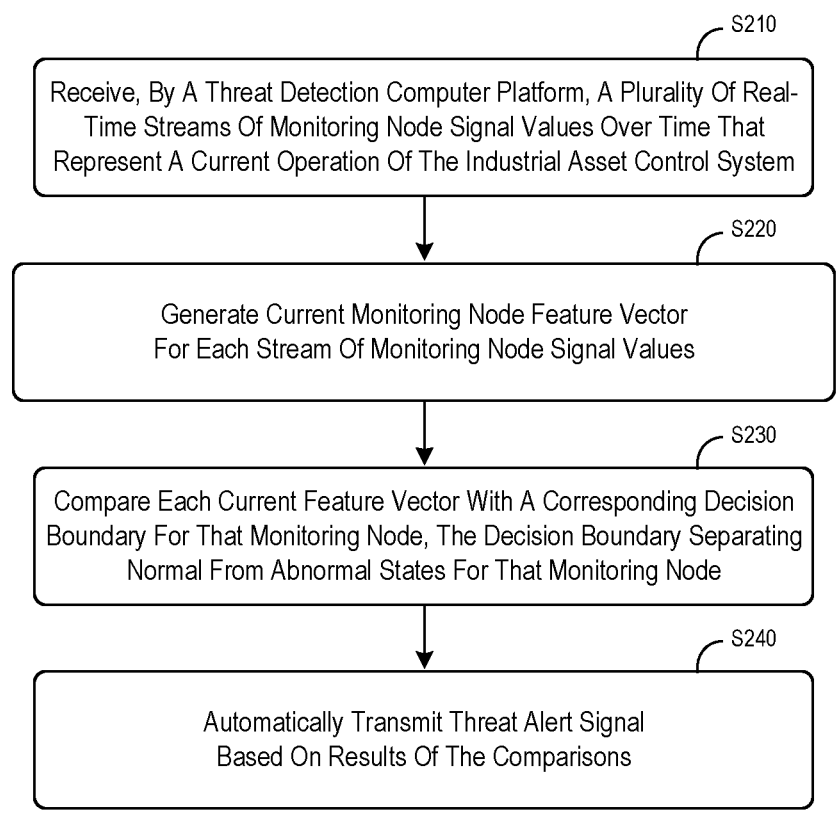
FIG. 2 is a method according to some embodiments.

For example, FIG. 2 illustrates a method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a plurality of real-time monitoring node signal inputs may receive streams of monitoring node signal values over time that represent a current operation of an industrial asset control system. At least one of the monitoring nodes (e.g., controller nodes, etc.) may be associated with, for example, sensor data, an auxiliary equipment input signal, a control intermediary parameter, and/or a control logic value.

At S220, a threat detection computer platform may receive the streams of monitoring node signal values and, for each stream of monitoring node signal values, generate a current monitoring node feature vector. According to some embodiments, at least one of the current monitoring node feature vectors is associated with principal components, statistical features, deep learning features, frequency domain features, time series analysis features, logical features, geographic or position based locations, and/or interaction features.

At S230, each generated current monitoring node feature vector may be compared to a corresponding decision boundary (e.g., a linear boundary, non-linear boundary, multi-dimensional boundary, etc.) for that monitoring node, the decision boundary separating a normal state from an abnormal state for that monitoring node. According to some embodiments, at least one monitoring node is associated with a plurality of multi-dimensional decision boundaries and the comparison at S230 is performed in connection with each of those boundaries. Note that a decision boundary might be generated, for example, in accordance with a feature-based learning algorithm and a high fidelity model or a normal operation of the industrial asset control system. Moreover, at least one decision boundary may exist in a multi-dimensional space and be associated with a dynamic model, design of experiments such as, a full factorial design, Taguchi screening design, a central composite methodology, a Box-Behnken methodology, and a real-world operating conditions methodology. In addition, a threat detection model associated with a decision boundary might, according to some embodiments, be dynamically adapted based on a transient condition, a steady state model of the industrial asset control system, and/or data sets obtained while operating the system as in self-learning systems from incoming data stream.

At S240, the system may automatically transmit a threat alert signal (e.g., a notification message, etc.) based on results of the comparisons performed at S230. The threat might be associated with, for example, an actuator attack, a controller attack, a monitoring node attack, a plant state attack, spoofing, financial damage, unit availability, a unit trip, a loss of unit life, and/or asset damage requiring at least one new part. According to some embodiments, one or more response actions may be performed when a threat alert signal is transmitted. For example, the system might automatically shut down all or a portion of the industrial asset control system (e.g., to let the detected potential cyber-attack be further investigated). As other examples, one or more parameters might be automatically modified, a software application might be automatically triggered to capture data and/or isolate possible causes, etc. Note that a threat alert signal might be transmitted via a cloud-based system, such as the PREDIX® field agent system. Note that according to some embodiments, a cloud approach might also be used to archive information and/or to store information about boundaries.

According to some embodiments, the system may further localize an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a control system by learning a priori from tuned high fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Thus, some embodiments may provide an advanced anomaly detection algorithm to detect cyber-attacks on, for example, key gas turbine control sensors. The algorithm may identify which signals(s) are being attacked using monitoring node-specific decision boundaries and may inform a control system to take accommodative actions. In particular, a detection and localization algorithm might detect whether a sensor, auxiliary equipment input signal, control intermediary parameter, or control logical are in a normal or anomalous state. Some examples of gas turbine monitoring nodes that might be analyzed include: critical control sensors (e.g., a generator power transducer signal, a gas turbine exhaust temperature thermocouple signal, a gas turbine speed signal, etc.); control system intermediary parameters (e.g., generator power, gas turbine exhaust temperature, compressor discharge pressure, compressor discharge temperature, compressor pressure ratio, fuel flow, compressor inlet temperature, guide vane angle, fuel stroke reference, compressor bleed valve, inlet bleed heat valve, etc.); auxiliary equipment input signals (e.g., signals sent to actuators, motors, pumps, etc.); and/or logical commands to controller.

Some embodiments of the algorithm may utilize feature-based learning techniques based on high fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on monitoring node data, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 3:
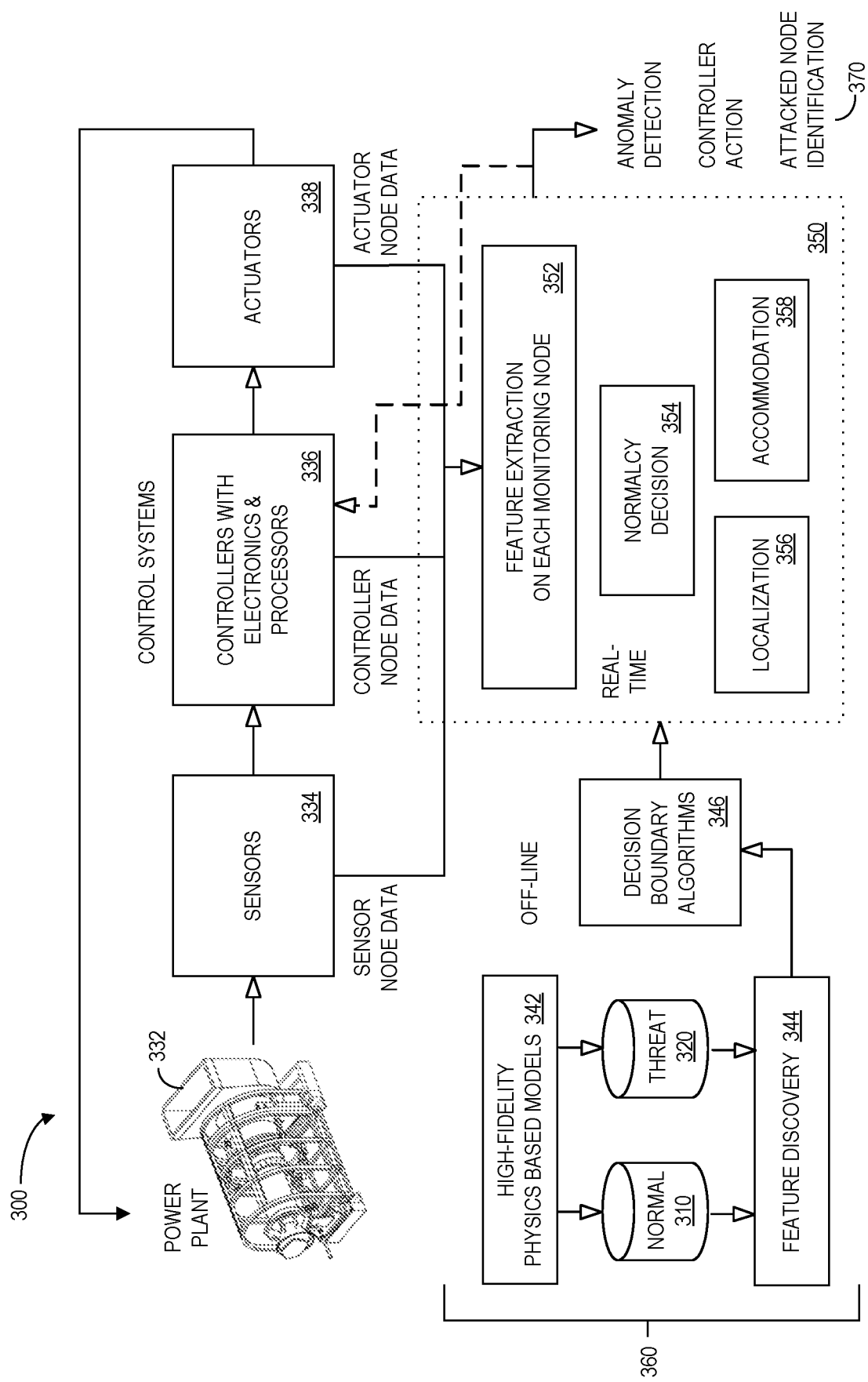
FIG. 3 is threat alert system in accordance with some embodiments.

A cyber-attack detection and localization algorithm may process a real-time turbine signal data stream and then compute features (multiple identifiers) which can then be compared to the sensor specific decision boundary. A block diagram of a system 300 utilizing a sensor specific gas turbine cyber-attack detection and localization algorithm according to some embodiments is provided in FIG. 3. In particular, a power plant 332 provides information to sensors 334 which helps controllers with electronics and processors 336 adjust actuators 338. A threat detection system 360 may include one or more high-fidelity physics based models 342 associated with the power plant 332 to create normal data 310 and/or threat data 320. The normal data 310 and threat data 320 may be accessed by a feature discovery component 344 and processed by decision boundary algorithms 346 while off-line (e.g., not necessarily while the power plant 332 is operating). The decision boundary algorithms 346 may generate a threat model including decision boundaries for various monitoring nodes. Each decision boundary may separate two data sets in a high dimensional space which is constructed by running a binary classification algorithm, such as a support vector machine using the normal data 310 and threat data 320 for each monitoring node signal (e.g., from the sensors 334, controllers 336, and/or the actuators 338).

A real-time threat detection platform 350 may receive the boundaries along with streams of data from the monitoring nodes. The platform 350 may include a feature extraction on each monitoring node element 352 and a normalcy decision 354 with an algorithm to detect attacks in individual signals using sensor specific decision boundaries, as well rationalize attacks on multiple signals, to declare which signals were attacked, and which became anomalous due to a previous attack on the system via a localization module 356. An accommodation element 358 may generate outputs 370, such as an anomaly decision indication (e.g., threat alert signal), a controller action, and/or a list of attached monitoring nodes.

During real-time detection, contiguous batches of monitoring node data may be processed by the platform 350, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may sometimes be on the actuators 338 and then manifested in the sensors 334 data. Attack assessments might be performed in a post decision module (e.g., the localization element 356) to isolate whether the attack is related any of the sensor, controller, or actuator (e.g., indicating which part of the monitoring node). This may be done by individually monitoring, overtime, the location of the feature vector with respect to the decision boundary. For example, when a sensor 334 is spoofed, the attacked sensor feature vector will cross the decision boundary earlier than the rest of the vectors as described with respect to FIGS. 4 through 6. If a sensor is declared to be anomalous, and the load command to the auxiliary equipment is later determined to be anomalous, it may be determined that the original attack, such as signal spoofing, occurred on the sensor 334. Conversely, if the signal to the auxiliary equipment was determined to be anomalous first, and then later manifested in the sensor 334 feedback signal, it may be determined that the signal to the equipment was initially attacked.

According to some embodiments, it may be detected whether or not a signal is in the normal operating space (or abnormal space) through the use of localized decision boundaries and real time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 4:
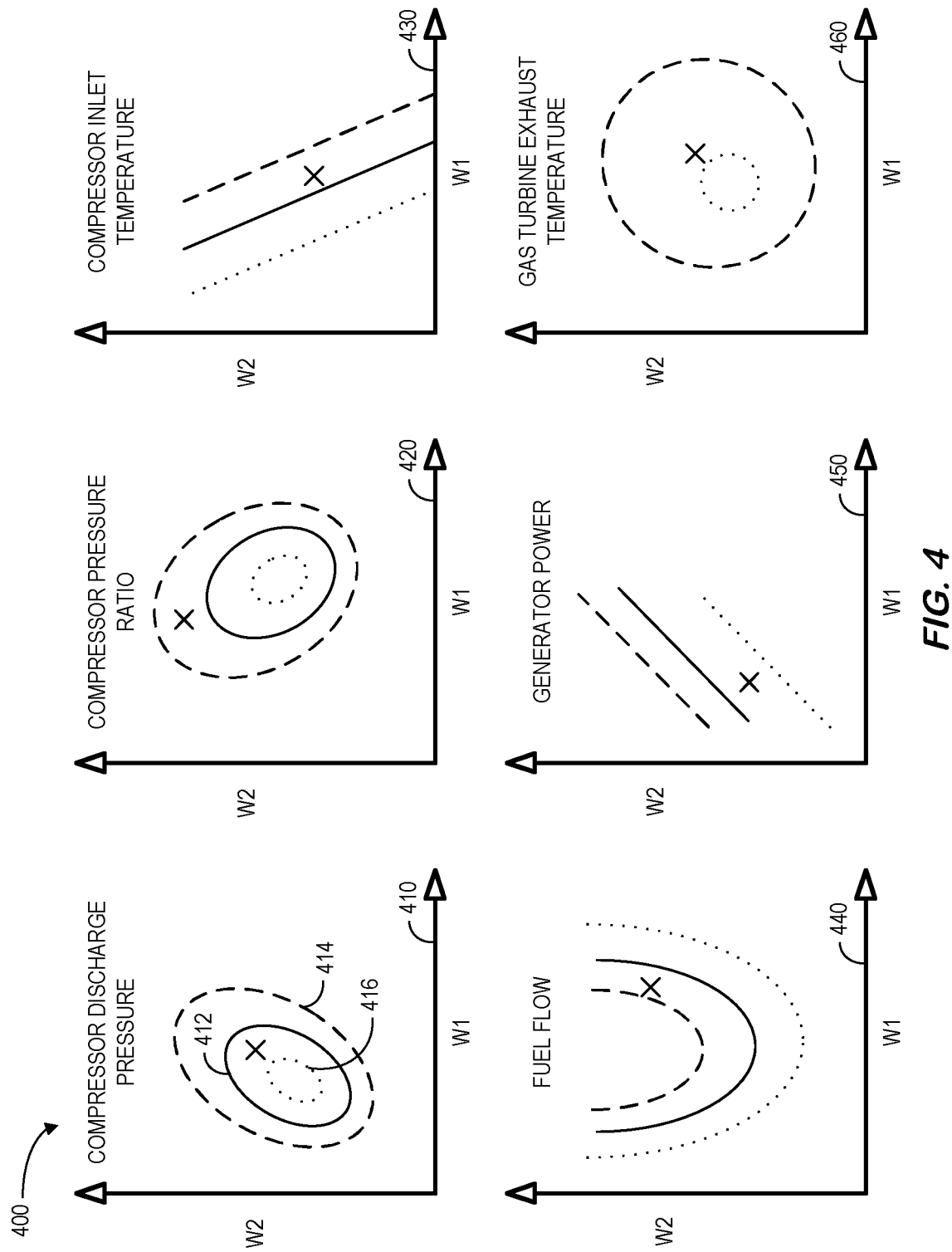
FIGS. 4 through 6 illustrate boundaries and feature vectors for various monitoring node parameters according to some embodiments.

FIG. 4 illustrates 400 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge temperature 410, compressor pressure ratio 420, compressor inlet temperature 430, fuel flow 440, generator power 450, and gas turbine exhaust temperature 460. Each graph includes a hard boundary 412 (solid curve), minimum boundary 416 (dotted curve), and maximum boundary 414 (dashed curve) and an indication associated with current feature location for each monitoring node parameter (illustrated with an "X" on the graph). As illustrated in FIG. 4, the current monitoring node location is between the minimum and maximum boundaries (that is, the "X" is between the dotted and dashed lines). As a result, the system may determine that the operation of the industrial asset control system is normal (and no threat is being detected indicating that the system is currently under attack).

Figure 5:
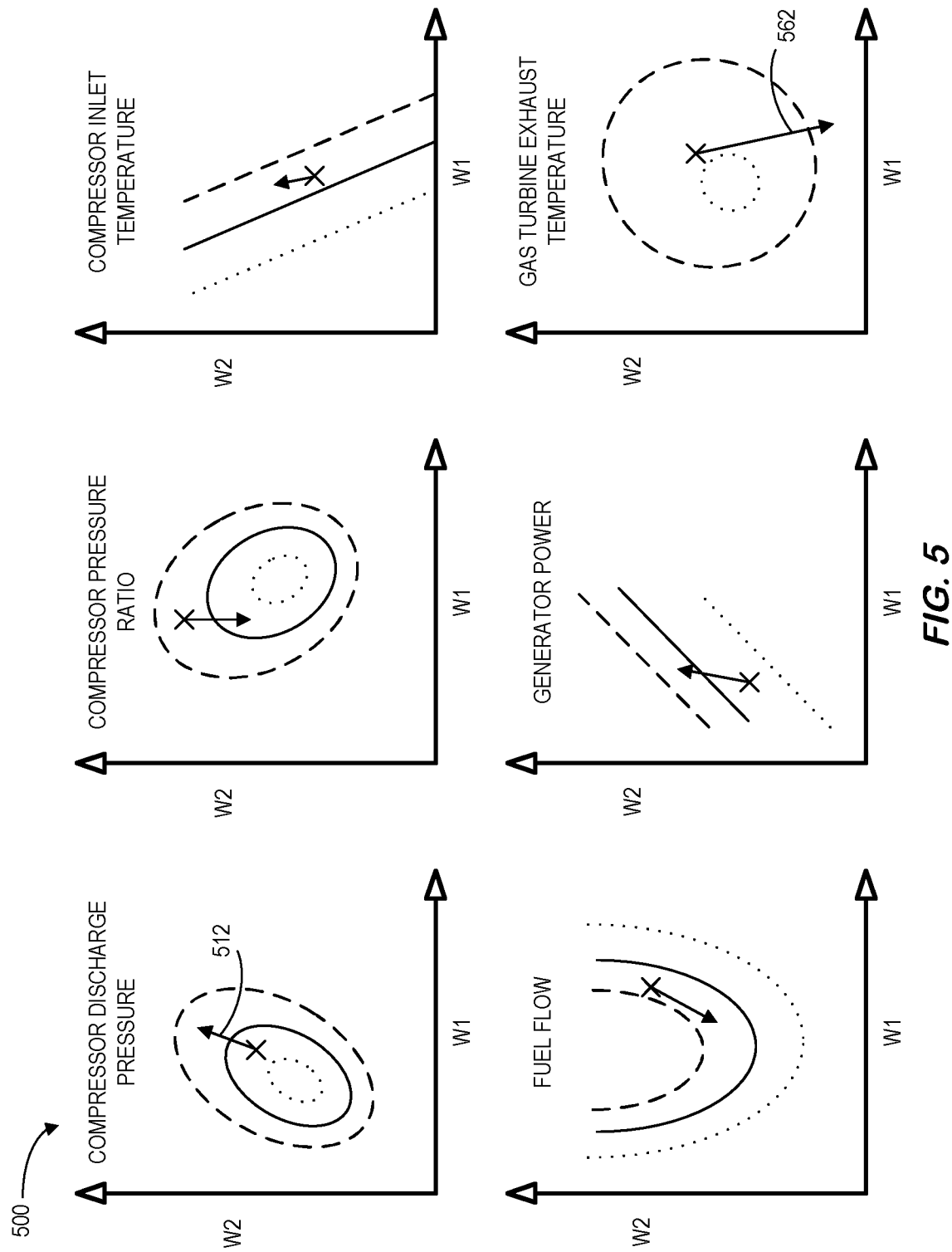

FIG. 5 illustrates 500 subsequent boundaries and feature vectors for these parameters. Consider, for example, a feature vector movement 512 for the compressor discharge pressure. Even though feature vector 512 has moved, it is still within the maximum and minimum boundaries and, as a result, normal operation of that monitoring node may be determined. This is the case for the first five graphs in FIG. 5. In this example, a feature vector movement 562 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary monitoring node signal feature vector illustrated in FIG. 5 moves 562 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 5, assume that the gas turbine exhaust temperature signal was attacked. This may cause the system to respond in such a way so as to put other signals into an abnormal state. This is illustrated 600 in FIG. 6, where the attack has already been detected and now other signals shown to be abnormal. In particular, feature movement for the compressor discharge pressure 612, compressor pressure ratio 622, compressor inlet temperature 632, and fuel flow 642 have all become abnormal (joining the feature vector for the gas turbine exhaust temperature 662). Note that the feature vector for generator power did not become abnormal. In order to decide whether or not these signals 612, 622, 632, 642 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to FDIA (which itself is very limited). The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running Design of Experiments ("DoE") experiments on high-fidelity models. A data set for each sensor might comprise a feature vector for given threat values (e.g., turbine speed, thermocouple scale factor, etc.). Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilze a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 6:
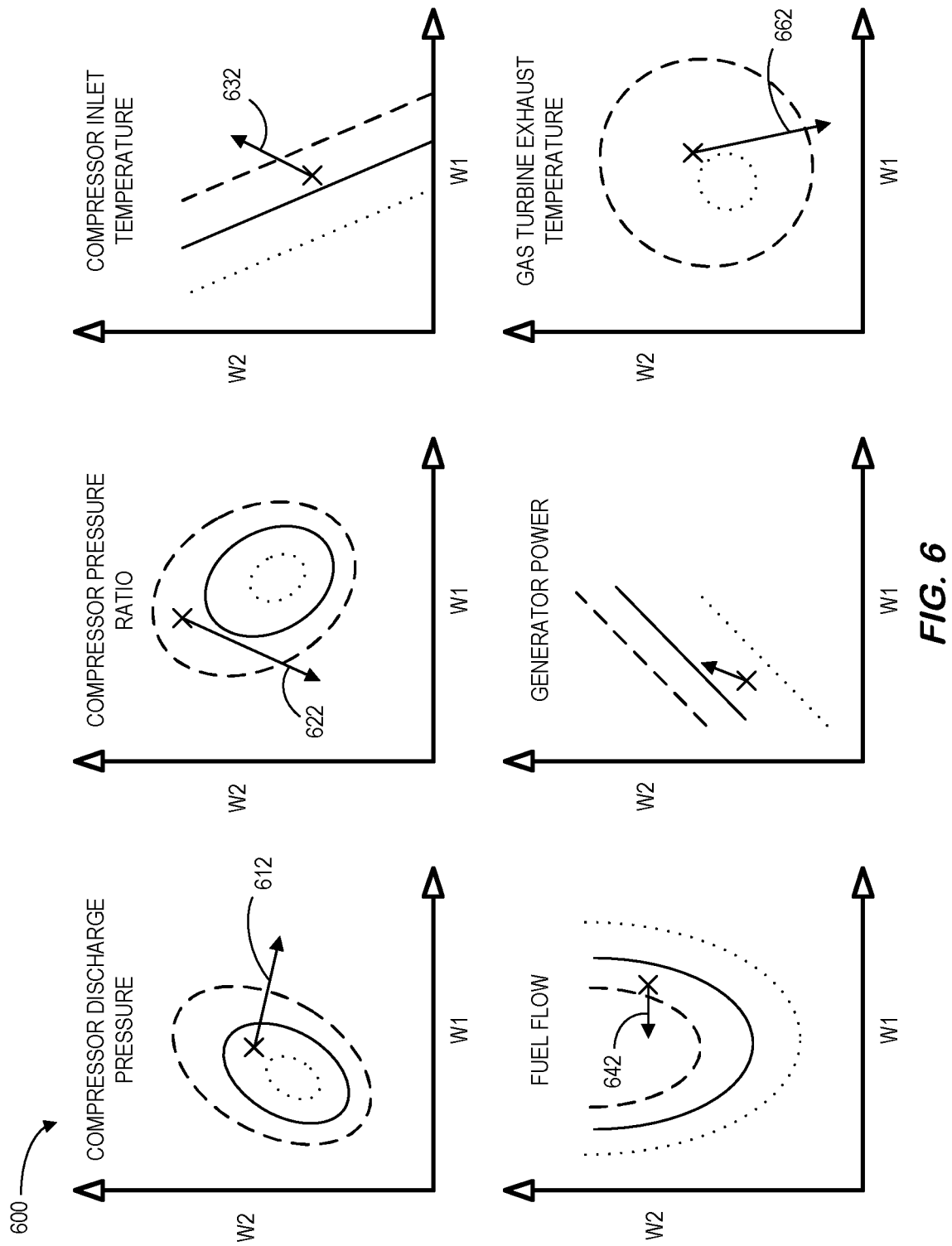

In some cases, multiple vector properties might be examined, and the information described with respect to FIGS. 4 through 6 may be processed to determine if the signal had been trending in a specific direction as the attack was detected (or if it had just been moving due to noise). Had the signal been uniformly trending as the attack took place, then this signal is a response to the original attack and not an independent attack.

Figure 7:
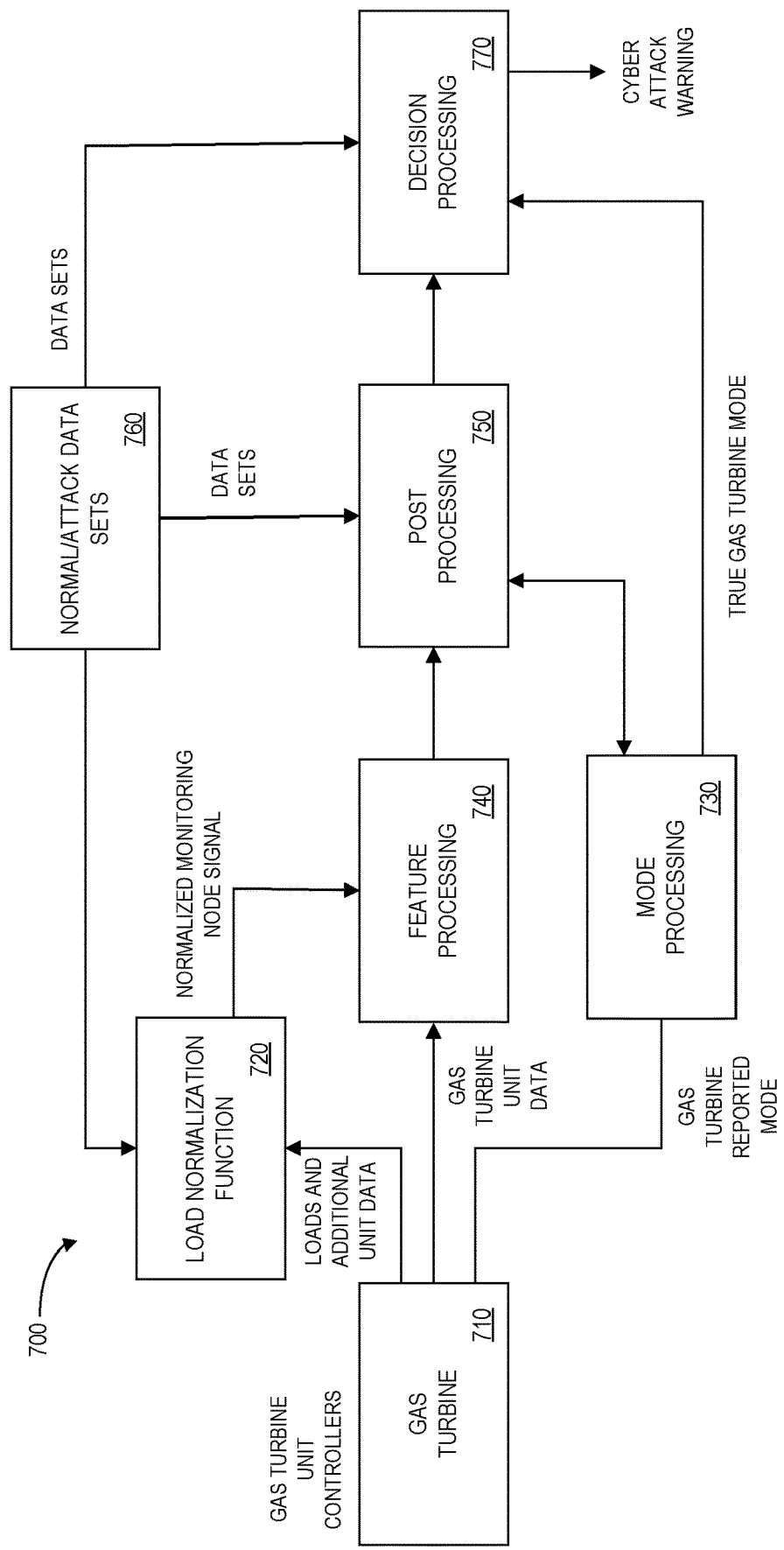
FIG. 7 illustrates a block diagram view of a cyber-attack detection system in accordance with some embodiments.

Note that an industrial asset control system may be associated with non-linear operations over a range of operating parameters (e.g., loads, temperatures, etc.). As a result, data variations can be substantial and determining when a cyber threat is present based on operation of the control system may be difficult. FIG. 7 illustrates a block diagram view of a cyber-attack detection system 700 in accordance with some embodiments. In particular, the system 700 illustrates a gas turbine 710 (e.g., associated with gas turbine unit controllers) that transmits information about loads (e.g., gas turbine loads, Adaptive Real-time Engine Simulation ("ARES" loads, etc.) to a load normalization function 720. The gas turbine 710 may also transmit information, to mode processing 730 (e.g., a gas turbine reported mode of operation) and feature processing 740 (e.g., gas turbine unit data). As will be described, the load normalization function 720 may transmit a normalized monitoring node signal to feature processing 740. Post processing 750 may receive information from feature processing 740 and transmit data to decision processing 770 (which can automatically create a cyber-attack warning based at least in part on data sets received from a normal/attack data sets storage unit 760). Thus, some embodiments may compute normalized monitoring node signals dynamically based on turbine load or temperature levels and temporal time-series signals. This normalization may provide capabilities to perform attack detection for different load conditions.

Note that embodiments might utilize temporal and/or spatial normalization. Temporal normalization may provide normalization along a time axis. Spatial normalization may be used to normalize signals along multiple nodes (e.g., sensor axis). In either case, the normalized signals may then be used to perform attack detection using feature extraction and comparisons to decision boundaries. Sensor, actuator, and controller node time-series data may be processed in substantially real-time to extract "features" from this data. The feature data may then be compared to a decision boundary to determine if a cyber-attack has occurred to the system. A similar approach may be used for detecting attacks in spatially normalized data.

The processing of the real-time data may utilize the normal operating point of the gas turbine 710. This normal operating point might be determined, for example, based on system operating modes, external conditions, system degradation factor, fuel input, etc. The real-time measured sensor data, actuator data, and controller nodes data may be processed such that a difference between actual and nominal values is computed and this difference, or delta, is normalized with the expected operating conditions coefficients. Note that turbine load level (e.g., as represented by Mega Watts ("MW")) may be computed based on multiple measurements, and a load may be estimated from an adaptive real time engine model.

According to some embodiments, the following may be performed off-line (not real time). For a given turbine mode, the gas turbine 710 operation may be simulated using high fidelity models. The load level may be changed from a lowest operating point to a highest operating point (e.g., using step changes every predefined time interval). This simulated data produces a number of normal running data files at varying load levels. Taking one of these files, the load level may be averaged and categorized into a pre-defined load level resolution (e.g., averaged to the nearest 0.25 MW). Using these normalization packets as an input to processing of the time series signals may facilitate dynamic normalization when running in real time. These outputs from the dynamic normalization process may then be then used in a feature discovery process.

Note that an industrial asset may behave differently when operating in different operating modes (e.g., warm-up mode, shutdown mode, etc.). As a result, it can be difficult to determine whether or not a cyber attack is occurring based on the behavior of the asset—especially when the asset can operate in a substantial number of different modes.

Figure 8:
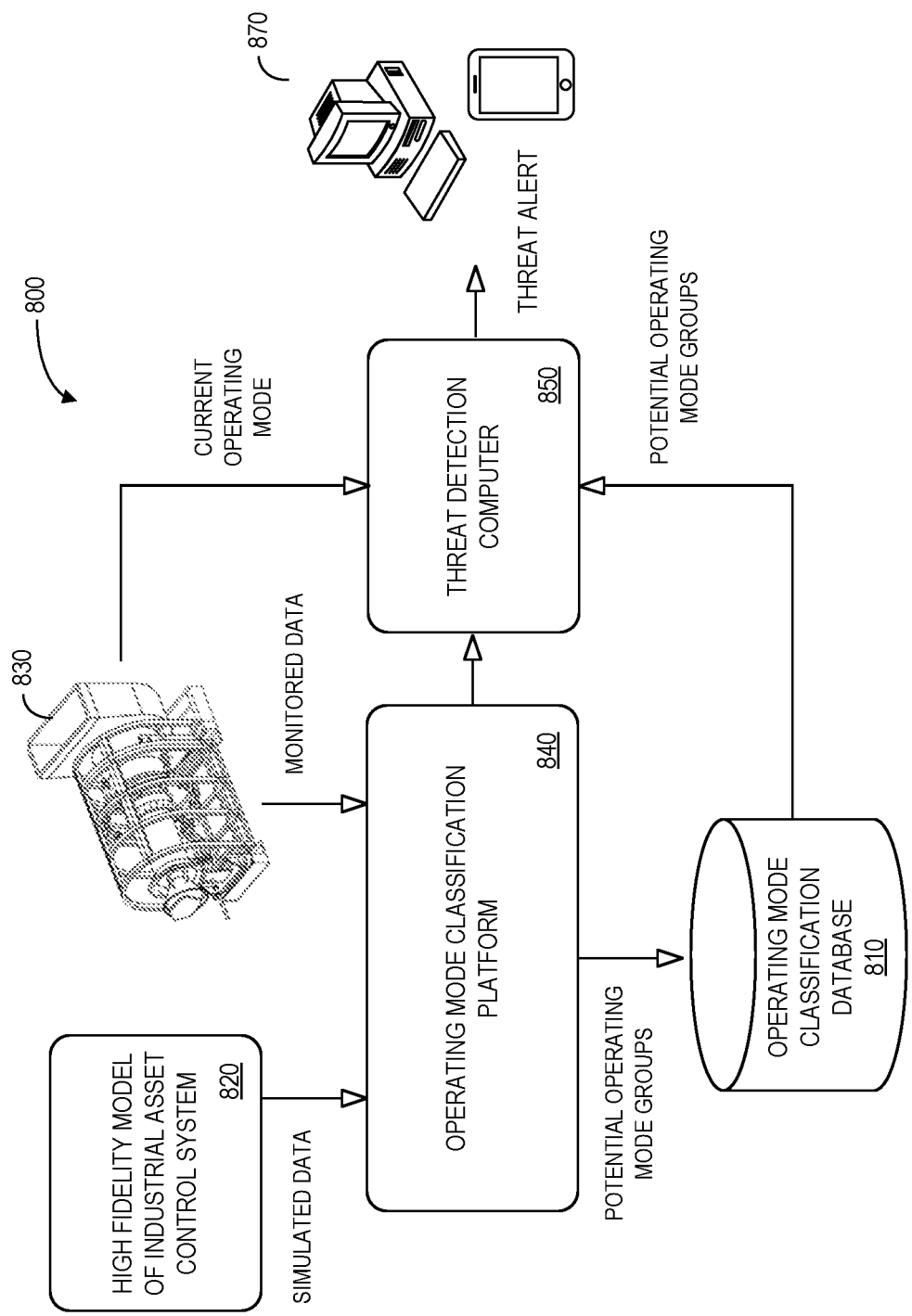
FIG. 8 is a high level block diagram of a system architecture according to some embodiments.

FIG. 8 is a high level block diagram of a system 800 architecture according to some embodiments. In particular, a threat detection computer 850 may receive a current operating mode form an industrial asset 830 (e.g., a jet turbine). Moreover, an operating mode classification platform 840 may receive monitored data from the industrial asset 830 (e.g., as is operates in various operating modes) and/or simulated data form one or more high fidelity models of the industrial asset control system 820 (e.g., as it simulates operation in various operating modes). According to some embodiments, the operating mode classification platform 840 may store potential operating "mode groups" into an operating mode classification database 810. As used herein, the phrase operating "mode groups" might refer to, for example, a group associated with one or more operating modes that share similar operating characteristics. As will be described, the threat detection computer 850 may receive information about the potential operating mode groups from the operating mode classification database 810 and use that information (along with current operating data) to generate threat alerts for remote monitoring devices 870 as appropriate.

Figure 9:
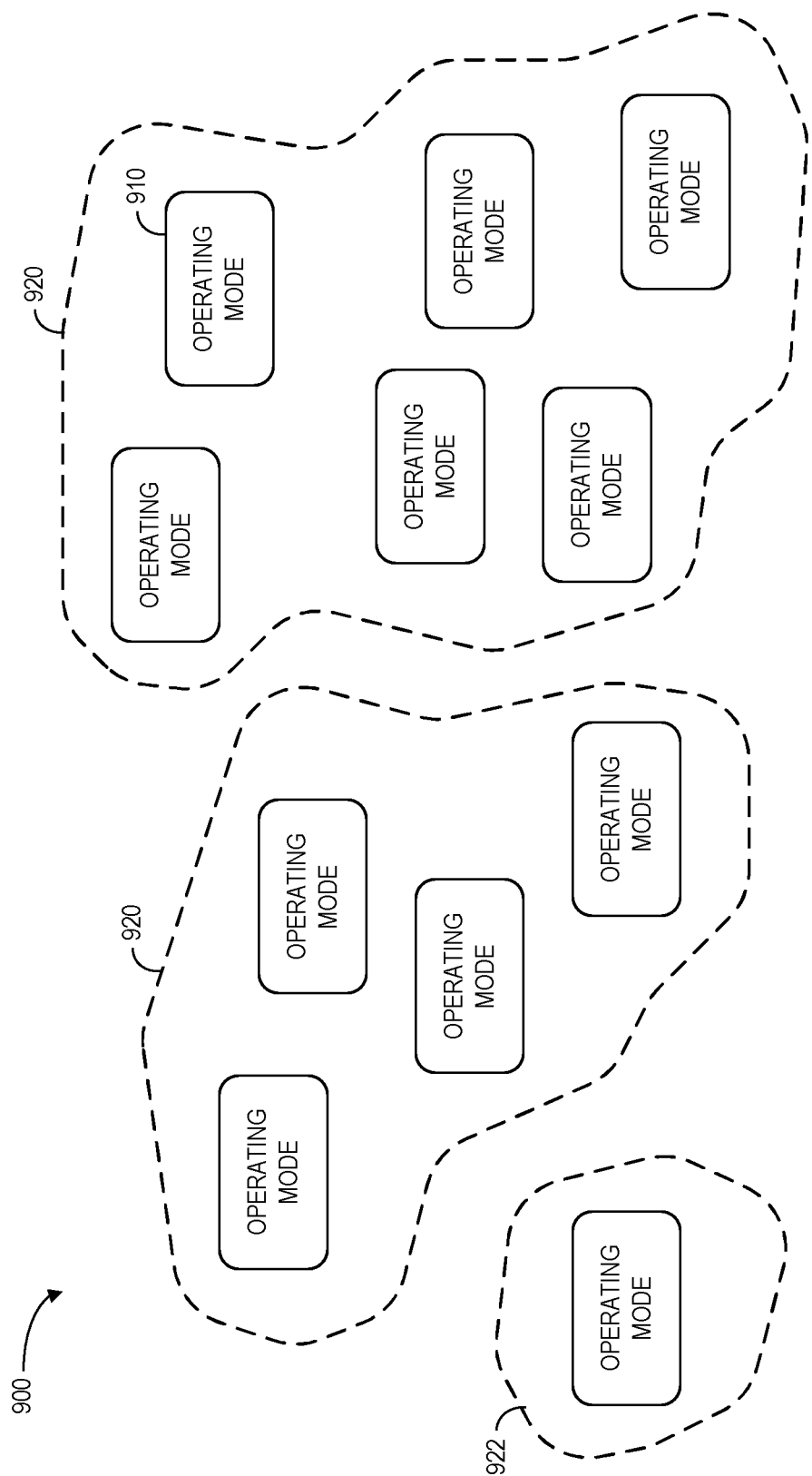
FIG. 9 illustrates industrial asset operating modes in accordance with some embodiments.

For example, the threat detection computer 850 may consider normal and attack parameters that are associated with various operating mode groups. FIG. 9 illustrates 900 industrial asset operating modes in accordance with some embodiments. In particular, consider an industrial asset able to operate in a number of different operating modes 910. In this case, sets of operating modes may be classified into potential operating mode groups 920 (with each group 920 containing a number of different operating modes 910 that share similar normal or attack characteristics). Note that, in some cases, a potential operating mode group 920 might be associated with a single operating mode in a one-to-one fashion (as is the case with operating mode group 922 in FIG. 9).

Figure 10:
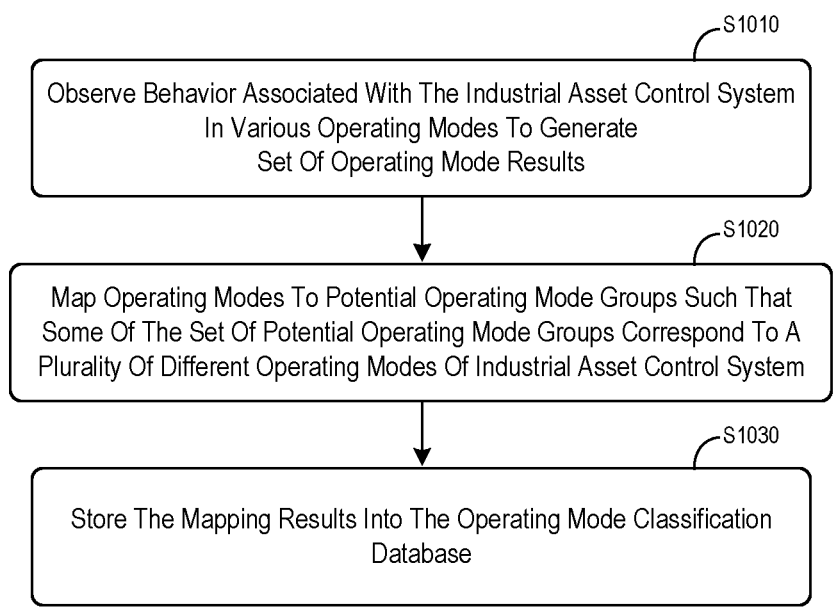
FIG. 10 is a mode classification method according to some embodiments.

FIG. 10 is a mode classification method according to some embodiments. At S1010, the system may monitor or simulate behavior associated with an industrial asset control system in various operating modes to generate a set of operating mode results. For example, the system may use a high fidelity model may simulate operation of an industrial asset control system in various operating modes to generate a set of operating results. According to some embodiments, the system may monitor the operation of the industrial asset control system (e.g., instead of simulation operation). At S1020, the system may map operating modes to potential operating mode groups such that some of the set of potential operating mode groups correspond to a plurality of different operating modes of the industrial asset control system. Note that the mapping of S1020 might be associated with an automatic analysis and/or a manual review of the set of mode results and the observed behavior associated with the industrial asset control system in various operating modes. An operating mode classification database may then be used to store the information about the potential operating mode groups at S1030.

Figure 11:
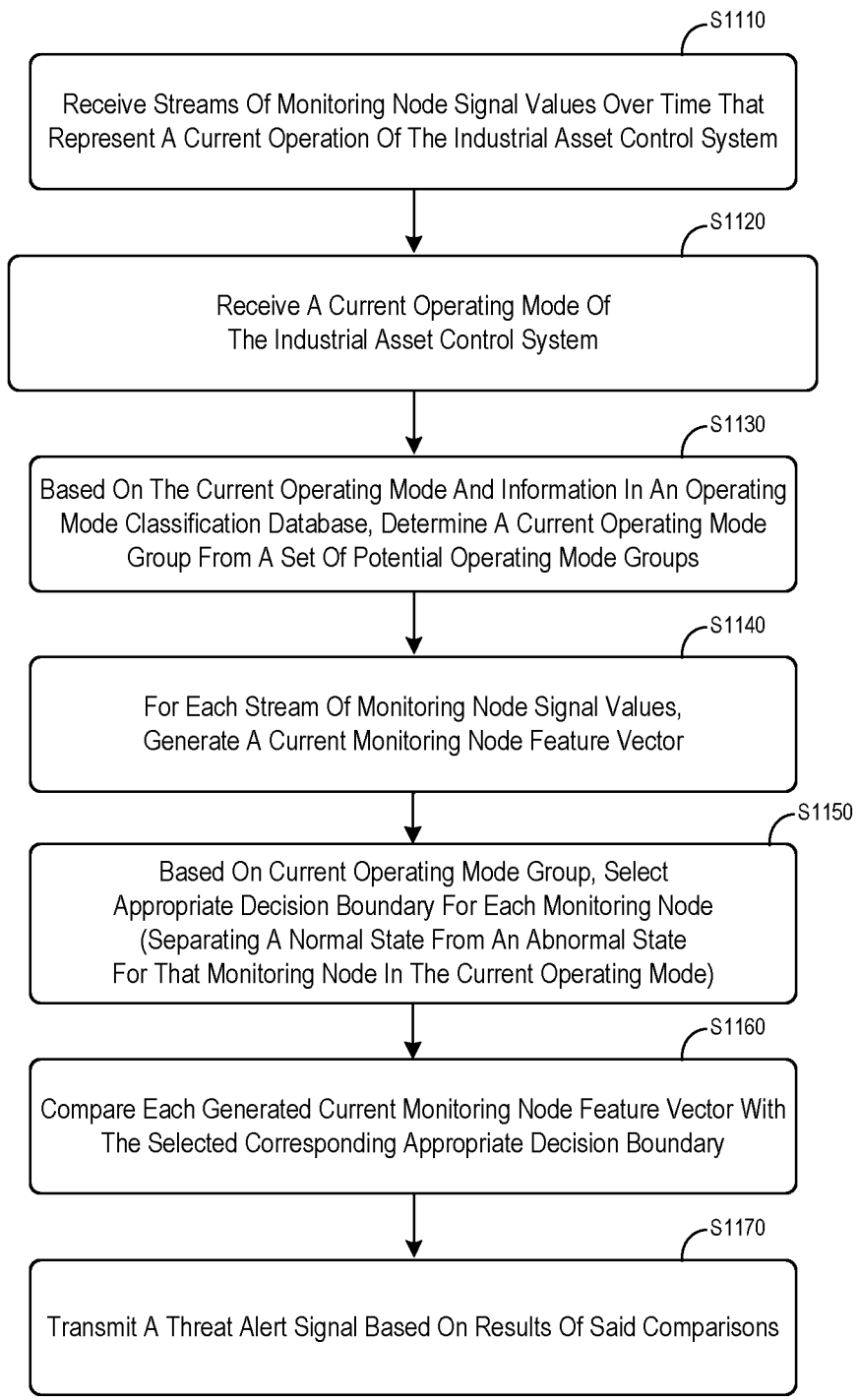
FIG. 11 is a threat detection method in accordance with some embodiments.

FIG. 11 is a threat detection method in accordance with some embodiments. At S1110, a plurality of real-time monitoring node signal inputs may receive streams of monitoring node signal values over time that represent a current operation of the industrial asset control system. At S1120, a threat detection computer platform, coupled to the plurality of real-time monitoring node signal inputs and an operating mode classification database, may receive a current operating mode of the industrial asset control system (e.g., based on a signal received from the asset). Based on the current operating mode and information in the operating mode classification database, at S1130 the system may determine a current operating mode group from a set of potential operating mode groups (with at least some of the set of potential operating mode groups corresponding to a plurality of different operating modes of the industrial asset control system). For example, the threat detection computer platform might map an "initialization" operating mode to a "startup process" group operating mode for a particular asset.

For each stream of monitoring node signal values, at S1140 the system may generate a current monitoring node feature vector. According to some embodiments, the generation of a current monitoring node feature vector may be further based on the current operating mode of the industrial asset control system. Based on the current operating mode group, at S1150 the system may select an appropriate decision boundary for each monitoring node (with the appropriate decision boundary separating a normal state from an abnormal state for that monitoring node in the current operating mode).

At S1160, the system may compare each generated current monitoring node feature vector with a corresponding decision boundary for that monitoring node. At S1170, the system may automatically transmit a threat alert signal based on results of said comparisons. The alert signal might be transmitted, for example, via a cloud-based application. According to some embodiments, the alert signal may be transmitted via one or more of a cloud-based system, an edge-based system, a wireless system, a wired system, a secured network, and a communication system.

Figure 12:
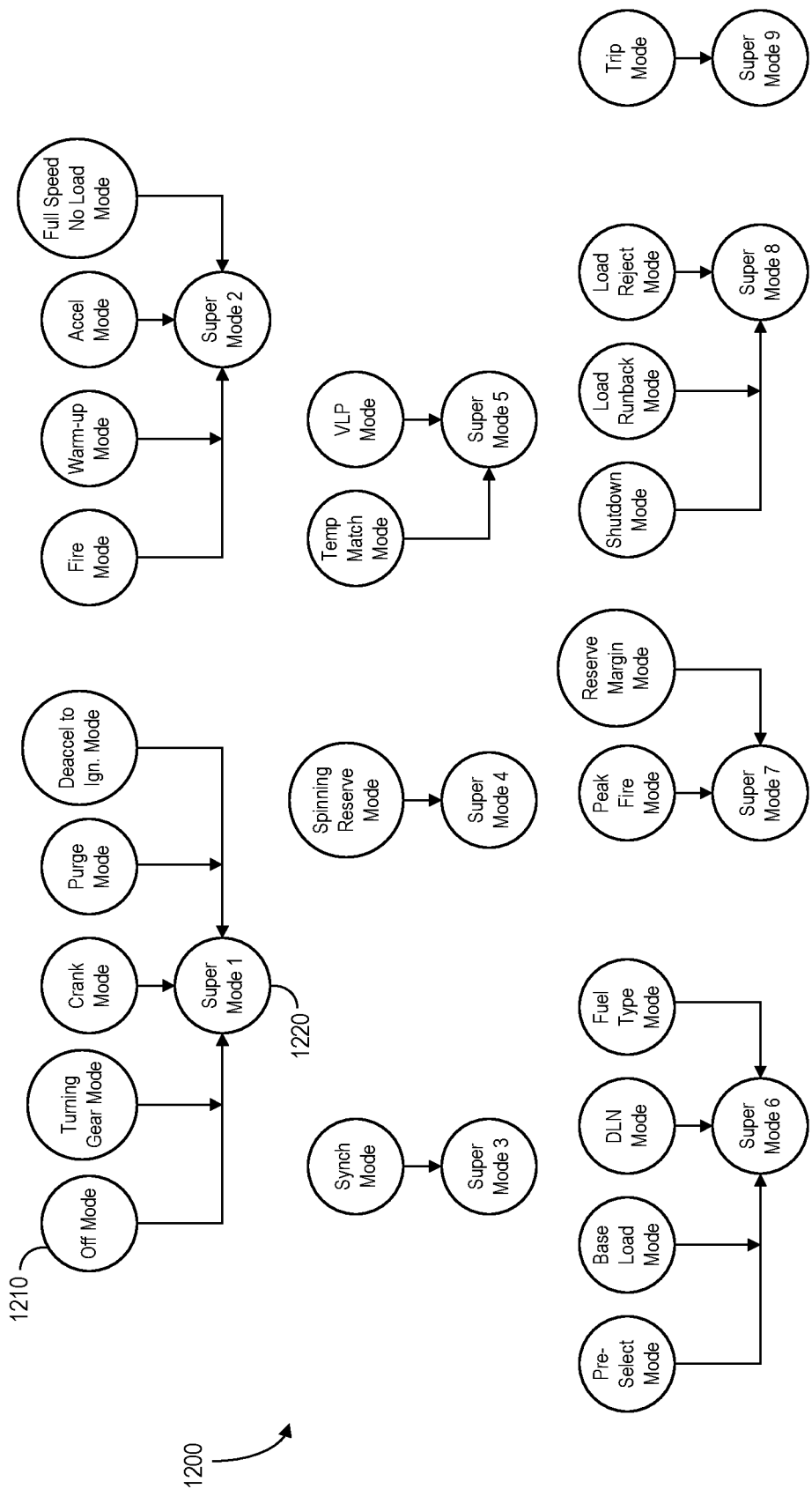
FIG. 12 illustrates jet turbine super modes/states used for detecting cyber attacks according to some embodiments.

FIG. 12 illustrates gas turbine super modes/states 1200 used for detecting cyber attacks according to some embodiments. As used herein, the phrases "super modes" or "super states" may refer to, for example, an operating mode group. Some embodiments described herein might be related to domain level cyber-security protection of a gas turbine. In the event of a cyber-attack, embodiments may determine if the gas turbine control system was attacked. System characteristics (or "features") and boundaries may be used in algorithms that dependent on the specific gas turbine operational modes or states. The control modes or operational states may be categorized into super modes/states ("operational mode groups"). According to some embodiments, super modes may be used to select the appropriate boundaries for use in the threat detection algorithm.

According to some embodiments, an algorithm may receive real-time data from monitoring nodes (e.g., sensor, actuator, and/or controller nodes) and control system state data from a unit controller. The data may be processed via a decision algorithm customized to a given super mode to compute a cyber-attack. The turbine control system state may include operational states such as, for example, off, turning gear, crank, purge, deceleration to ignition, fire, accelerate, full speed no load, synchronize, spinning reserve, emissions compliant turndown, preselected load, base load, peak load, power augmentation, reserve margin, unload, deceleration, coast down, cooldown, temperature matching, variable load path, MBC enabled, Dry Low Nox ("DLN") mode, Actuated Gas Valve ("AGV") mode, trip mode, shutdown, runback, load reject (normal/fast), step to spinning reserve, fuel transfer and/or general mode transition. An alert notification may then be generated once the attack/anomaly is detected.

Referring to FIG. 12, note that various operating modes 1210 may be combined into super modes 1220 (or "operating mode groups"). For example, super mode 1 might represent an unfired mode and may include operational states such as off, turning gear, crank, purge, and/or deceleration to ignition. Super mode 2 might represent a fired mode at part speed up to synchronization speed, and super mode 3 might represent a mode with common synchronization period. According to some embodiments, super mode 4 represents a mode with spinning reserve. Note that super modes 3 and 4 might be combined into a single super mode (and other embodiments may have more than one in these modes combined with similar characteristics). Super mode 5 might be associated with variable load path and temperature match modes that are combined (note that variable load path may contain temperature and power set points and may be combined with a temperature match mode that also contains temperature set point). Super mode 6 might be a primary load path mode comprised of power set points (and may be dependent on liquid or gas fuel type selection. Super mode 7 might represent a peak firing mode where the gas turbine is run at elevated firing temperature (and may also contain reserve margin control). Super mode 8 might represent a shutdown or runback mode while super mode is a "trip" mode where all machine operation is immediately terminated.

After forming super modes, decision boundaries may be constructed using any of the techniques described herein. Note that primary feature may be extracted from the data using multimodal feature discovery process. Since the features can be any high level abstraction of the data (e.g., statistical descriptors, shallow learning features, and/deep learning features), embodiments might use them depending on the need for each super mode. Also, to achieve better discrimination between attack and normal data in feature space, embodiments may augment the vector formed with distinct features by their pure quadratic or cubic terms or interaction terms such as product of features within super modes and/or across super modes from different systems. According to some embodiments, cross products may address a correlation between the features and squared features may provide more resolution.

After feature vectors are constructed for a variety of data sets for different super mode conditions (e.g., simulated attack data, normal operating data, etc.), these vectors may be processed to construct mode specific decision boundaries. Attack decision might then be made by knowing the gas turbine mode and selecting an appropriate corresponding decision boundary.

Figure 13:
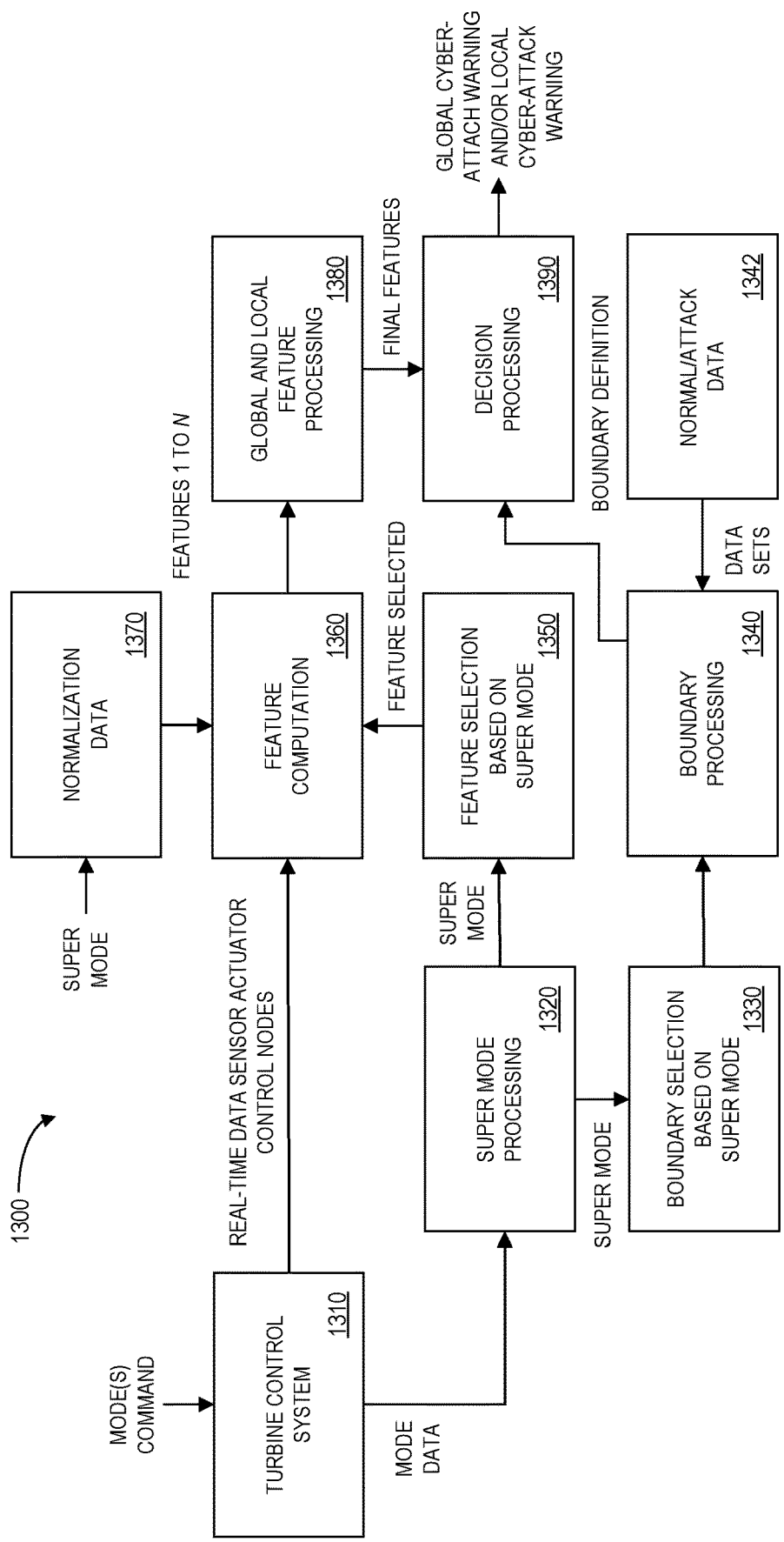
FIG. 13 is an example of an algorithm diagram for real-time attack detection according to some embodiments.

FIG. 13 is an example of an algorithm diagram 1300 for real-time attack detection according to some embodiments. Note that normal/attack conditions might be learned from either physics based simulation data or from an actual machine (by learning from data) to obtain accurate decision boundaries. Decision boundaries may be dependent on the current gas turbine operating mode and may be different based on these operational super modes. It may be important that the correct super mode is established and the correct boundaries are used in final decision processing. Note that a turbine may operate under different modes and one decision boundary across all modes might not provide accurate detection. Thus, some embodiments described herein may select a correct boundary knowing a turbine's super mode logical(s) from a gas turbine unit controller. The true turbine mode may provide more accurate results in the sensor/actuator/controller node cyber-attack decision analytics.

In the diagram 1300 of FIG. 13, a turbine control system 1310 may provide mode data to a super mode processing element 1320 which, in turn, may provide super mode data to a boundary selection based on super mode element 1330. This element 1330 may feed a boundary processing element 1340 that also receives data sets of normal attack data 1342 and outputs a boundary definition to a decision processing unit 1390 (that will ultimately generate global and/or local cyber attack warnings as appropriate). The turbine control system 1310 may also provide real-time data sensor actuator controller node information to a feature computation element 1360 (that also receives normalization data 1370 and a selected feature from a feature selection based on super mode element 1350). Note that "global" and local feature processing 1380 may also output final features to the decision processing element 1390. With respect to "global" feature processing, consider a system that includes three generators (A, B, and C) and batches of values from threat nodes are collected for each generated over a period of time (e.g., 30 to 50 seconds). According to some embodiments, the batches of values from threat nodes may overlap in time. The values from threat nodes may, for example, be stored in a matrix arranged by time (t1, t2, etc.) and by type of threat node (S1, S2, etc.). Feature engineering components may use information in each matrix to create a feature vector for each of the three generators. The three feature vectors associated with generators A, B, and C may then be combined into a single global feature vector for the system. Interaction features may be applied (e.g., associated with A*B*C, A+B+C, etc.) and an anomaly detection engine may compare the result with a decision boundary and output a threat alert signal when appropriate. According to some embodiments, a system generate a global feature vector from a plurality of current monitoring node feature vectors. Based on a current operating mode group, the system may then select an appropriate global decision boundary separating a normal state from an abnormal state. The generated global feature vector may be compared to the selected global decision boundary, and a threat alert signal may be transmitted as appropriate based on the result of the comparison.

Figure 14:
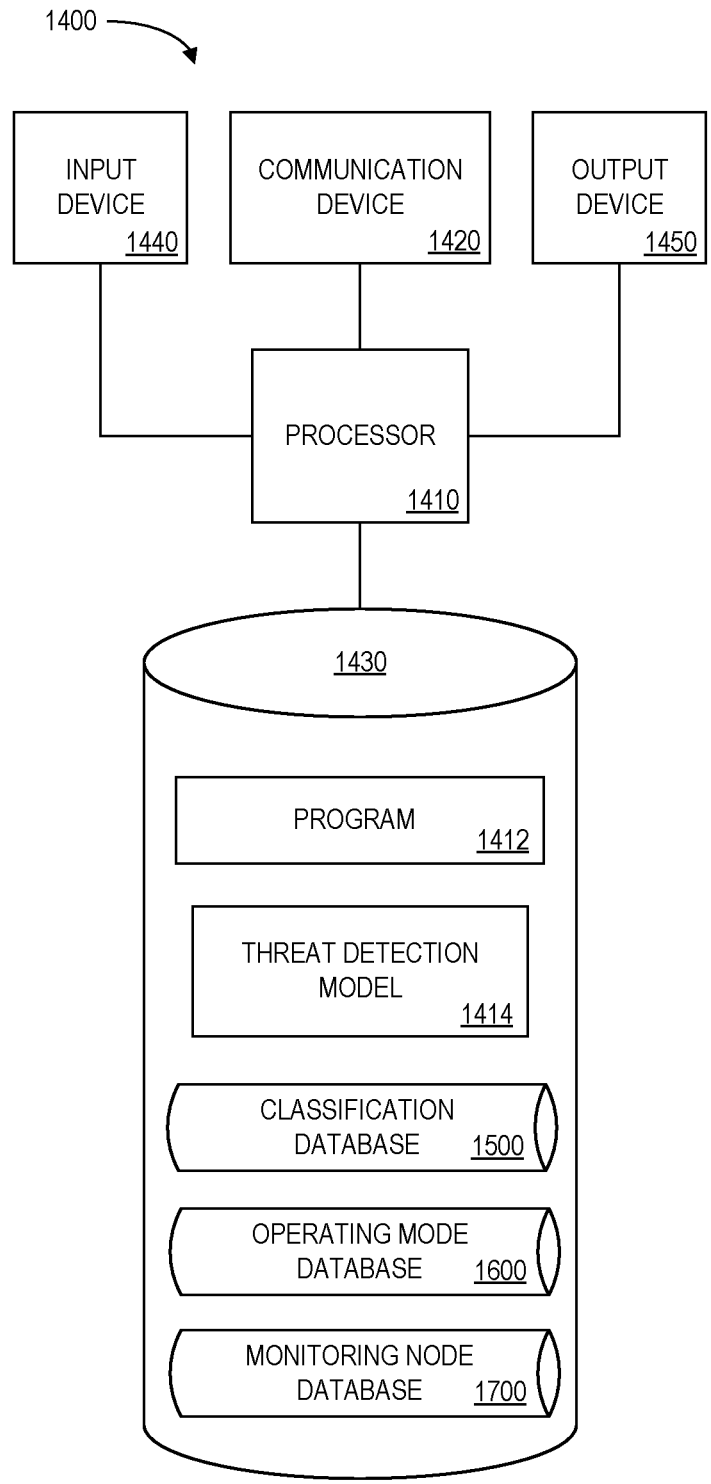
FIG. 14 is a block diagram of an industrial asset control system protection platform according to some embodiments of the present invention.

The embodiments described herein may be implemented using any number of different hardware configurations. For example, FIG. 14 is a block diagram of an industrial asset control system protection platform 1400 that may be, for example, associated with the system 140 of FIG. 1. The industrial asset control system protection platform 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more remote monitoring nodes, user platforms, etc. The industrial asset control system protection platform 1400 further includes an input device 1440 (e.g., a computer mouse and/or keyboard to input adaptive and/or predictive modeling information) and/an output device 1450 (e.g., a computer monitor to render a display, provide alerts, transmit recommendations, and/or create reports). According to some embodiments, a mobile device, monitoring physical system, and/or PC may be used to exchange information with the industrial asset control system protection platform 1400.

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or a threat detection model 1414 for controlling the processor 1410. The processor 1410 performs instructions of the programs 1412, 1414, and thereby operates in accordance with any of the embodiments described herein. For example, the processor 1410 may receive streams of monitoring node signal values over time that represent a current operation of an industrial asset control system. A current operating mode of the industrial asset control system may be received by the processor 1410 and used to determine a current operating mode group from a set of potential operating mode groups. For each stream of monitoring node signal values, a current monitoring node feature vector may be determined by the processor 1410. Based on the current operating mode group, an appropriate decision boundary may be selected by the processor 1410 for each monitoring node, the appropriate decision boundary separating a normal state from an abnormal state for that monitoring node in the current operating mode. Each generated current monitoring node feature vector may be compared by the processor 1410 with the selected corresponding appropriate decision boundary, and a threat alert signal may be automatically transmitted by the processor 1410 based on results of said comparisons.

The programs 1412, 1414 may be stored in a compressed, uncompiled and/or encrypted format. The programs 1412, 1414 may furthermore include other program elements, such as an operating system, clipboard application, a database management system, and/or device drivers used by the processor 1410 to interface with peripheral devices.

As used herein, information may be "received" by or "transmitted" to, for example: (i) the industrial asset control system protection platform 1400 from another device; or (ii) a software application or module within the industrial asset control system protection platform 1400 from another software application, module, or any other source.

In some embodiments (such as the one shown in FIG. 14), the storage device 1430 further stores a classification database 1500, an operating mode database 1600, and a monitoring node database 1700. Example of databases that may be used in connection with the industrial asset control system protection platform 1400 will now be described in detail with respect to FIGS. 15 through 17. Note that the databases described herein are only examples, and additional and/or different information may be stored therein. Moreover, various databases might be split or combined in accordance with any of the embodiments described herein.

Figure 15:
FIG. 15 is a tabular portion of a classification database in accordance with some embodiments.

Referring to FIG. 15, a table is shown that represents the classification database 1500 that may be stored at the industrial asset control system protection platform 1000 according to some embodiments. The table may include, for example, entries identifying operating modes associated with an industrial asset control system. The table may also define fields 1502, 1504, 1506 for each of the entries. The fields 1502, 1504, 1506 may, according to some embodiments, specify: an industrial asset identifier 1502, an operating mode 1504 and an operating mode group 1506. The classification database 1500 may be created and updated, for example, off line (non-real time) when a new physical system is monitored or modeled.

The industrial asset identifier 1502 may be, for example, a unique alphanumeric code identifying an industrial asset to be monitored. The operating mode 1504 might indicate various modes in which the asset might operate. The operating mode group 1506 might map those modes into super modes (or "mode groups"). As illustrated in FIG. 15, the first three operating modes in the table 1500 are all mapped to a single operating mode group ("OMG_01").

Figure 16:
FIG. 16 is a tabular portion of an operating mode database in accordance with some embodiments.

Referring to FIG. 16, a table is shown that represents the operating mode database 1600 that may be stored at the industrial asset control system protection platform 1000 according to some embodiments. The table may include, for example, entries identifying normal operating conditions associated with an industrial asset control system. The table may also define fields 1602, 1604, 1606, 1608, 1610 for each of the entries. The fields 1602, 1604, 1606, 1608, 1610 may, according to some embodiments, specify: a monitoring node identifier 1602 and associated model, a time series of data values 1604, an average value 1606, a current operating mode 1608, and operating mode group 1610. The monitoring node database 1600 may be created and updated, for example, based on information received as an industrial asset is monitored.

The monitoring node identifier 1602 may be, for example, a unique alphanumeric code identifying a node being monitored (e.g., associated with a sensor). The time series of data values 1604 might be a batch of operating data from that node and the average value 1606 may be computed to determine an operating condition of the asset. The current operating mode 1608 might indicate the current state of the industrial asset, and the operating mode group 1610 may be based on, or associated with, information from the classification database 1500. Note that by mapping a number of different operating modes to a lesser number of operating mode groups, fewer decision boundaries may need to be calculated and the overall performance of the system may be improved (while still accurately detecting cyber attacks).

Figure 17:
FIG. 17 is a tabular portion of a monitoring node database according to some embodiments.

Referring to FIG. 17, a table is shown that represents the monitoring node database 1700 that may be stored at the industrial asset control system protection platform 1000 according to some embodiments. The table may include, for example, entries identifying monitoring nodes associated with a physical system. The table may also define fields 1702, 1704, 1706, 1708, 1710 for each of the entries. The fields 1702, 1704, 1706, 1708, 1710 may, according to some embodiments, specify: a monitoring node identifier 1702, monitoring node values 1704, a current feature vector 1706, a decision boundary 1708, and a result 1710. The monitoring node database 1700 may be created and updated, for example, when a new physical system is monitored or modeled, monitoring nodes report values, operating conditions change, etc.

The monitoring node identifier 1702 may be, for example, a unique alphanumeric code identifying a monitoring node in an industrial asset control system, such as a sensor node that detects the series of monitoring node values 1704 over time (e.g., in batches of 30 to 50 seconds of data). The monitoring node values 1704 may be used to create the current feature vectors 1706. The decision boundary 1708 might be a high-dimensional decision boundary 1708 separating normal operation of an industrial asset from abnormal operation (and may be selected based on the operating mode group 1610 in the operating mode database). The result 1710 (e.g., normal or alert indicating a potential threat) might be generated by comparing the current feature vector 1706 with the decision boundary 1708.

Thus, embodiments may provide a user with turbine mode attack protection and also provide more accurate handling of sensor/actuator/controller node attack processing with proper decision boundaries applicable to the selected mode. Moreover, embodiments may enable the passive detection of indications of multi-class abnormal operations using real-time signals from monitoring nodes. Still further, the detection framework may allow for the development of tools that facilitate proliferation of the invention to various systems (i.e., gas turbines, steam turbines, wind turbines, aviation engines, locomotive engines, power grid, etc.) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset control system operators so that an attack may be thwarted (or the effects of the attack may be blunted), reducing damage to equipment.

Note that cyber security is an important function required in the protection of assets, such as power plant equipment. Dynamic normalization in this space may improve the resolution of detection. The machines associated with industrial assets can be very complex, and embodiments described herein may permit an implementation of a cyber security algorithm that makes detections fast and reliably.

Note that a Receiver Operating Conditions ("ROC") curve might be used to evaluate the use of dynamic normalization for load fluctuations (e.g., including indications of true and false positive detections, true and false negative detections, etc.).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 18:
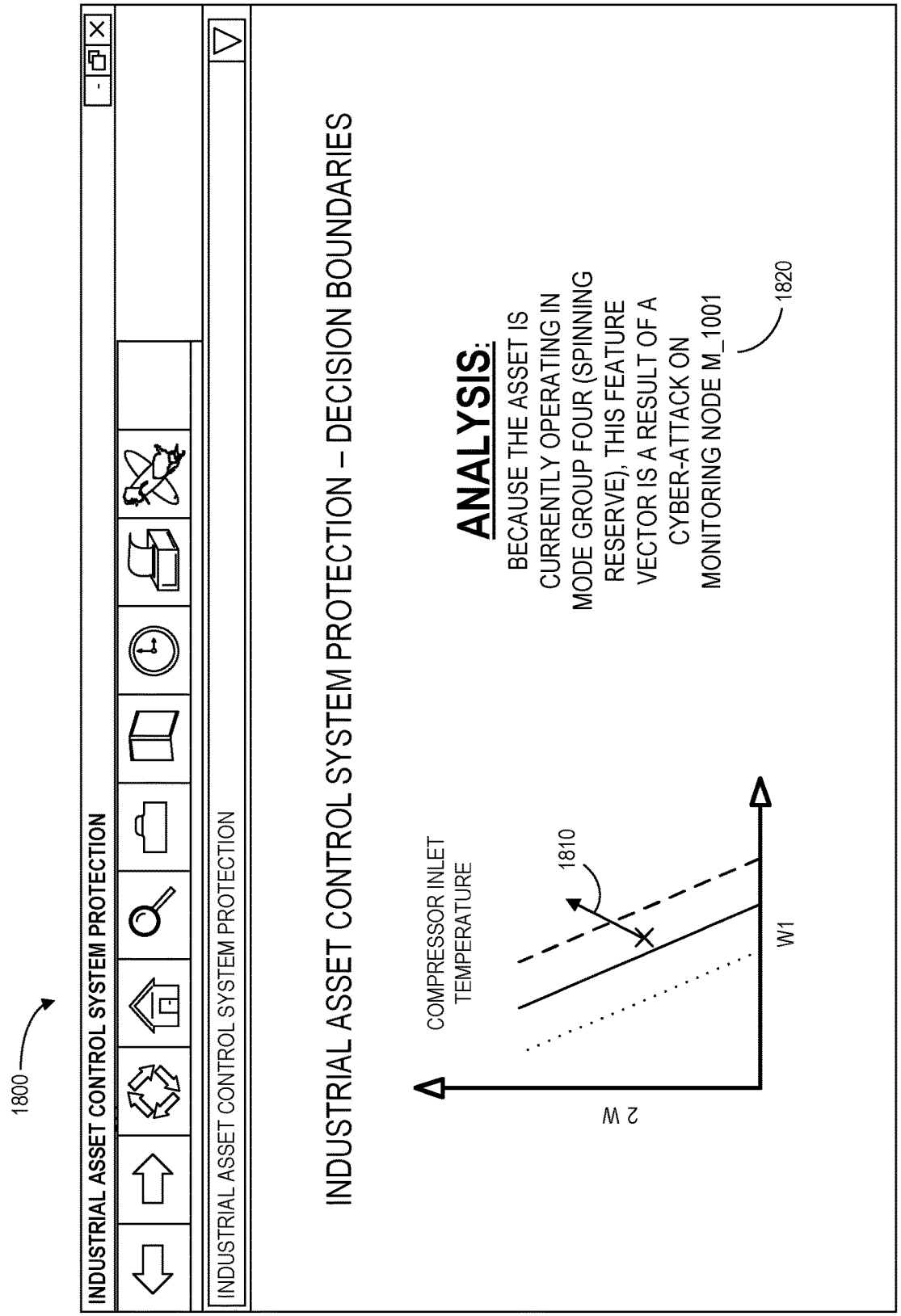
FIG. 18 is a display according to some embodiments.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as damns, the power grid, military devices, etc. Moreover, note that some embodiments may be associated with a display of monitoring node threat data to an operator. For example, FIG. 18 illustrates an interactive Graphical User Interface ("GUI") display 1800 that might display monitoring node information (e.g., including a current feature vector and decision boundaries) along with an automatically generated analysis 1820 of the data. According to some embodiments, information about attack statuses may be interwoven between different industrial asset plants. For example, one power plant might be aware of the status of other nodes (in other power plants) and such an approach might help thwart coordinated cyber-threats.

In addition to automatic threat detection, some embodiments described herein might provide systems with an additional cyber layer of defense and be deployable without custom programming (e.g., when using operating data). Some embodiments may be sold with a license key and could be incorporated as monitoring service. For example, boundaries might be periodically updated when equipment at an industrial asset plant is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A computerized method to protect an industrial asset control system, comprising:
   receiving, from a plurality of real-time monitoring node signal inputs, streams of monitoring node signal values over time that represent a current operation of the industrial asset control system;
   receiving a current operating mode into a threat detection computer platform of the industrial asset control system;
   based on the current operating mode and information in an operating mode classification database, determining, by the threat detection computer platform, that a first operating mode group is a current operating mode group, the first operating mode group being select from a set of potential operating mode groups, wherein the first operating mode group corresponds to a first plurality of different operating modes of the industrial asset control system and is associated with a first decision boundary separating a normal state from an abnormal state, and a second operating mode group corresponds to a second plurality of different operating modes of the industrial asset control system and is associated with a second decision boundary different than the first decision boundary;

based on the streams of monitoring node signal values, generating at least one current monitoring node feature vector;

based on the current operating mode group, selecting the first decision boundary as an appropriate decision boundary;

comparing the at least one generated current monitoring node feature vector with the first decision boundary; and automatically transmitting a threat alert signal based on a result of said comparison.

2. The method of claim 1, further comprising, prior to said receiving:

observing, by an operating mode classification platform, behavior associated with the industrial asset control system in various operating modes to generate a set of operating mode results; and mapping, by the operating mode classification platform, operating modes to the potential operating mode groups such that at least some of the set of potential operating mode groups correspond to a plurality of different operating modes of the industrial asset control system.

3. The method of claim 2, wherein said observing is associated with a high-fidelity model of the industrial asset control system.

4. The method of claim 2, wherein said observing is associated with an actual operation of the industrial asset control system.

5. The method of claim 2, wherein said mapping is associated with at least one of: (i) an automatic analysis, and (ii) a manual review of the set of mode results and the observed behavior associated with the industrial asset control system in various operating modes.

6. The method of claim 1, wherein said generation of a current monitoring node feature vector is further based on the current operating mode of the industrial asset control system.

7. The method of claim 1, wherein at some of the set of potential operating mode groups correspond to a single operating mode of the industrial asset control system.

8. The method of claim 1, wherein the industrial asset control system is associated with a gas turbine.

9. The method of claim 8, wherein at least one potential mode group is associated with at least one of: (i) a unfired mode, (ii) a fired mode at part speed up to synchronization speed, (iii) a mode with a common synchronization period, (iv) a mode with spinning reserve, (v) a mode with a variable load path and temperature match, (vi) a primary load path mode, (vii) a peak firing mode, (viii) a shutdown or runback mode.

10. The method of claim 1, wherein at least one monitoring node is associated with a plurality of decision boundaries and said comparison is performed in connection with each of those boundaries.

11. The method of claim 1, wherein the threat alert signal transmission is performed using at least one of: (i) a cloud-based system, (ii) an edge-based system, (iii) a wireless system, (iv) a wired system, (v) a secured network, and (vi) a communication system.

12. The method of claim 1, wherein the threat is associated with at least one of: an actuator attack, a controller attack, a monitoring node attack, a plant state attack, spoofing, financial damage, unit availability, a unit trip, a loss of unit life, and asset damage requiring at least one new part.

13. The method of claim 1, further comprising:

generating, by the threat detection computer platform, a global feature vector from a plurality of current monitoring node feature vectors;

based on the current operating mode group, selecting an appropriate global decision boundary separating a normal state from an abnormal state;

comparing the generated global feature vector with the selected global decision boundary; and automatically transmitting the threat alert signal based on the result of the comparison.

* * * * *